(12) United States Patent
Pavlyushchik

(10) Patent No.: US 8,656,494 B2
(45) Date of Patent: Feb. 18, 2014

(54) SYSTEM AND METHOD FOR OPTIMIZATION OF ANTIVIRUS PROCESSING OF DISK FILES

(75) Inventor: Mikhail A. Pavlyushchik, Vancouver (CA)

(73) Assignee: Kaspersky Lab, ZAO, Moscow (RU)

( * ) Notice: Subject to any disclaimer, the term of this patent is extended or adjusted under 35 U.S.C. 154(b) by 117 days.

(21) Appl. No.: 13/406,754

(22) Filed: Feb. 28, 2012

(65) Prior Publication Data

US 2013/0227692 A1 Aug. 29, 2013

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/00 | (2013.01) |
| G06F 21/56 | (2013.01) |

(52) U.S. Cl.
CPC .............. *G06F 21/00* (2013.01); *G06F 21/56* (2013.01); *G06F 21/561* (2013.01)
USPC ................................. 726/24; 726/22; 713/188

(58) Field of Classification Search
USPC ........................................ 726/22–25; 713/188
See application file for complete search history.

(56) References Cited

U.S. PATENT DOCUMENTS

| | | | |
|---|---|---|---|
| 6,473,800 B1 * | 10/2002 | Jerger et al. ................... | 709/226 |
| 7,036,147 B1 | 4/2006 | Hursey | |
| 7,472,420 B1 * | 12/2008 | Pavlyushchik ................. | 726/24 |
| 7,540,027 B2 | 5/2009 | Achanta et al. | |
| 7,581,253 B2 | 8/2009 | Challener et al. | |
| 7,591,019 B1 | 9/2009 | Sobko et al. | |
| 7,616,570 B2 | 11/2009 | Ronneke et al. | |
| 7,647,336 B2 | 1/2010 | Branda et al. | |
| 7,694,150 B1 * | 4/2010 | Kirby ............................ | 713/188 |
| 7,797,702 B1 | 9/2010 | Ferrie | |
| 7,836,505 B2 | 11/2010 | Ballard | |
| 7,930,749 B2 | 4/2011 | Ballard et al. | |
| 7,945,787 B2 * | 5/2011 | Gassoway ..................... | 713/188 |
| 7,984,503 B2 * | 7/2011 | Edwards ......................... | 726/24 |
| 8,060,924 B2 * | 11/2011 | Usov .............................. | 726/10 |
| 2003/0236864 A1 | 12/2003 | Lai | |
| 2004/0264472 A1 | 12/2004 | Oliver et al. | |
| 2006/0129603 A1 * | 6/2006 | Park et al. .................. | 707/104.1 |
| 2007/0240222 A1 * | 10/2007 | Tuvell et al. .................... | 726/24 |
| 2009/0083852 A1 | 3/2009 | Kuo et al. | |
| 2009/0125885 A1 | 5/2009 | Gayathri et al. | |
| 2010/0005843 A1 | 1/2010 | Aizpurua Plaza | |
| 2011/0029772 A1 * | 2/2011 | Fanton et al. ................. | 713/165 |
| 2011/0167275 A1 * | 7/2011 | Niemel .......................... | 713/188 |
| 2013/0185799 A1 * | 7/2013 | Pfeifer et al. .................. | 726/24 |
| 2013/0198841 A1 * | 8/2013 | Poulson ......................... | 726/23 |

FOREIGN PATENT DOCUMENTS

GB 2432686 5/2007

* cited by examiner

*Primary Examiner* — Brandon Hoffman
*Assistant Examiner* — Jayesh Jhaveri
(74) *Attorney, Agent, or Firm* — Bardmesser Law Group

(57) ABSTRACT

A system and method for optimization of AV processing of disk files. The system includes an AV scanner, a data cache module, an AV service and file analysis module. The optimization allows for reduction of time needed for the AV processing. Trusted files associated with a trusted key file are found. The trusted files that have been found are cached and excluded from further AV processing and the AV processing time is reduced.

23 Claims, 5 Drawing Sheets

SYSTEM AND METHOD FOR OPTIMIZATION OF ANTIVIRUS PROCESSING OF DISK FILES

BACKGROUND OF THE INVENTION

1. Field of the Invention

The present invention is related to optimization of antivirus (AV)/file security check/file trust check processing of disk files, and more particularly, to caching a list of trusted files in order to reduce AV scanning time.

2. Description of the Related Art

Advances in computer science produce a large number of applications employed by users. However, this also produces a number of malware applications that hinder functionality of other useful applications. Modern malware includes a variety of viruses, Trojans, worms, spyware, etc. The malware applications infect user computers, which results in malfunctions or malicious use of these computers. Additionally, the malware, such as network worms, migrates to other computers, infecting them as well.

Means of anti-virus (AV) protection are developed and perfected constantly in order to combat advances of the malware. User files located on disk need to be scanned for malware presence. Typically, such scanning is done by user request, i.e., on-demand scanning. The AV application checks the files against databases of signatures, heuristics, etc. However, the main shortcoming of these methods is disk overuse during the AV scan due to increases in volumes of the AV databases.

File AV processing can be optimized using, for example, white lists and black lists based on file modification time stamps. US Patent Publication No. 2009/083852 A1 describes an on demand scanning method where a system sends data (e.g., a list of file hashes) to a white/black list server, indicating the time of last successful connection to the server. The server responds to a request and returns information about the data found during the AV scan. The system decides, based on the information provided from the server, if the file in question is a trusted file or malware. The main shortcoming of this method is necessity to send repeated requests to the server regarding which files are changed and/or are trustworthy.

Another method for optimization of AV scanning is provided in the U.S. Pat. No. 7,591,019 B1. The system checks files and records their checksums and stores them into a special table. One feature of this system is preliminary collection/calculation of control sums, since, with a long time between checks, the number of files that potentially needs to be scanned becomes very large. When the file is checked for the next time, the current checksum is compared against the checksum stored in the table. If the checksum has changed, the file had been modified and needs to be scanned for malware. In order for this system to be effective, the files need to be checked frequently. Otherwise, many files can be modified and scanning will take a long time. At the same time, frequent file scans overload the disk.

Conventional scanning methods normally rely on checking every file on a disk, which takes a long time. A method for optimization of the AV/security check scanning of disk files is desired. Accordingly, a system and method for reducing the time of the AV/security check scanning of the disk files by creating a cache of trusted file control sums or identifiers is provided.

SUMMARY OF THE INVENTION

The present invention is related to methods for AV processing, and more particularly, to optimization of the AV/security file check processing by caching a list of trusted files in order to reduce AV/security file check scanning time.

In one aspect of the invention, a system and method optimization of AV processing of disk files. The optimization allows for reduction of time needed for the AV processing. Trusted files associated with a trusted key file are found. The trusted files that have been found are cached and excluded from further AV processing. Thereby, AV processing time is reduced.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
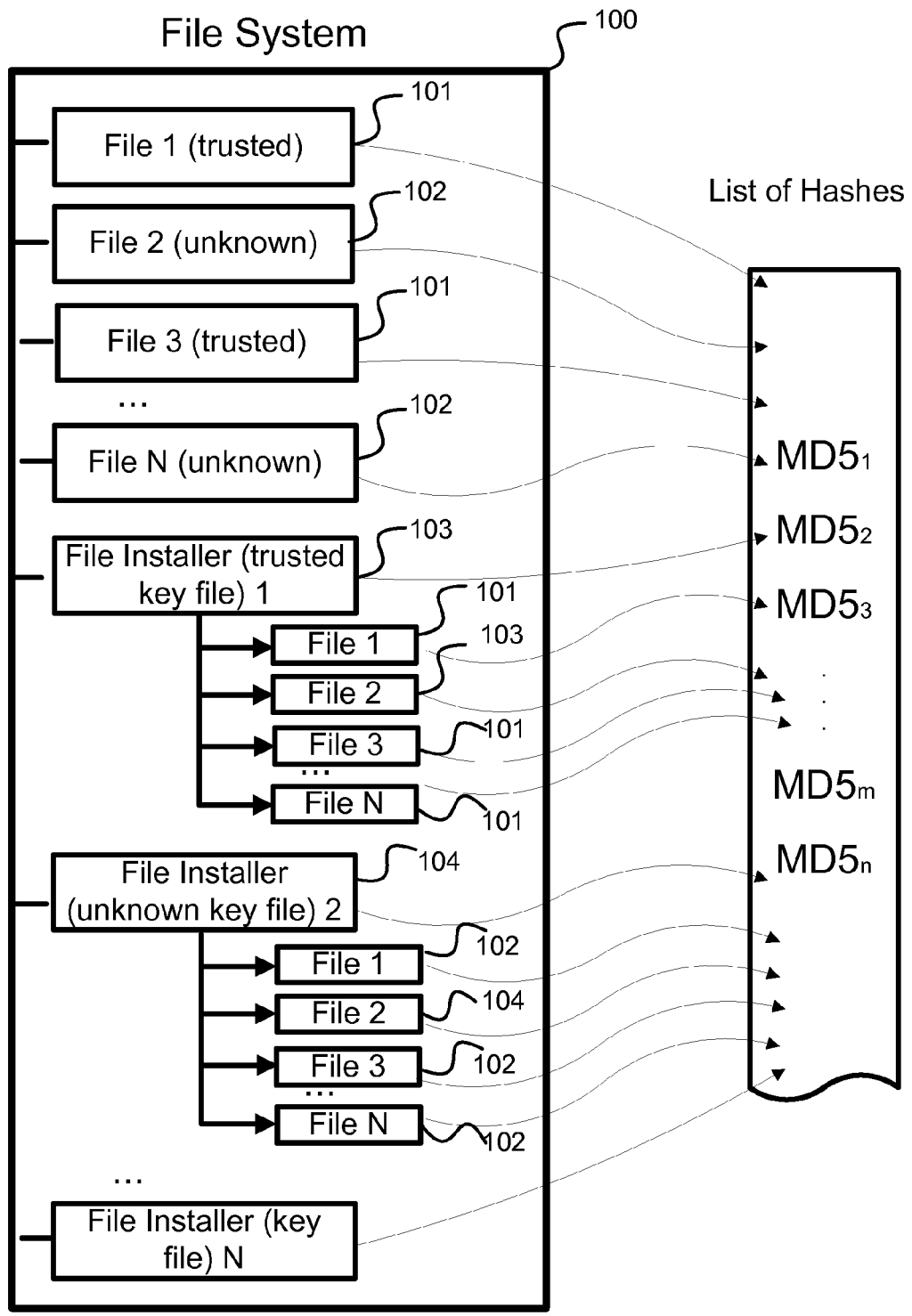
FIG. 1 illustrates AV analysis of an object, in accordance with the exemplary embodiment.

Reference will now be made in detail to the preferred embodiments of the present invention, examples of which are illustrated in the accompanying drawings.

In the following discussion, the following terminology is used:

Software package—a program product that includes one or more files, which, upon installation on the user's computer, are copied to the computer's disk drive. Thus, with a high degree of probability, finding one file means that other files from that set are usually present.

Key file—a file that identifies a unique software package. The strategy of selection of the key file is based on being able to quickly identify it on the user's computer, given that the key file, with a high degree of confidence, identifies the software package. As one example, an *.exe file or an installer file can be a key file.

The AV scan optimization method described herein includes determining of key files within the data sets and finding the files that are connected to the key file. A key file is a file that can identify the source data set. The data set is a plurality of interconnected files. The key file method can optimize AV processing by using data set information. However, this method can also take a long time.

According to the exemplary embodiment, a method and system for optimization of AV scanning/file security check of the disk files is provided. According to the proposed method, the trusted files associated with a key file are determined, as discussed below. Thus, the identifiers of the trusted files (such as hashes or checksums) can be cached and the trusted files can be excluded from further AV scanning, so that the AV scanning time can be reduced.

According to the exemplary embodiment, all files are separated into the following categories (see FIG. 1):

a) 101—known (trusted) file, i.e., files that are known to be legitimate, or clean, files;

b) 102—unknown files, i.e., the files whose trustworthiness is not known by the system, and which may be either clean or malicious (and which are not, as an initial matter, associated with any particular installer);

c) 103—trusted key files, i.e., key files derived from trusted files 101. The key file is the file that identifies other files. An example of a key file is an executable file or an application installer. A key file is one that can be quickly identified on a user's computer, and which can be used to identify other files from a particular software package. Typically, it is located together with the files with which it is associated, for example, in the same root directory. Often, the key file is an executable file, e.g., *.exe, *.msi, *.rar files, etc. Files with particular names, such as setup or autorun files, can also be key files. Particular files from a file set, such as a file with a license, can also be a key file;

d) 104—unknown/untrusted key files, i.e., the files similar to the files 103, but not known to the system, and therefore, the file 104 cannot be trusted at this point.

According to the exemplary embodiment, the system generates hashes of the files 101-104 and all further analysis is performed on these hashes. Alternatively, the files can be analyzed by file metadata. The file metadata is the data that can uniquely identify the file (for example, file name, file size, file version, file format, file hash, file system identifier, etc.).

FIG. 1 illustrates AV analysis of an object, such as a file of a file system 100. In the exemplary embodiment, the object is a file or a data set (for example, an application installer 103, 104, located in the computer file system 100, together with the files that it installs, see, e.g., the files labeled 101 and 102, associated with installer files 103, 104, in FIG. 1). The data set, e.g., 103, 104, consists of a set of files having a common property. This common property can be any data that uniquely identifies the files from the data set. In theory, any group of files can have a key file, which identifies the files in the data set. The files 101, 102 in the data set associated with the key files 103, 104, can be of different types. For example, they can be executable files, system files, text files, gifs, etc.

Figure 2:
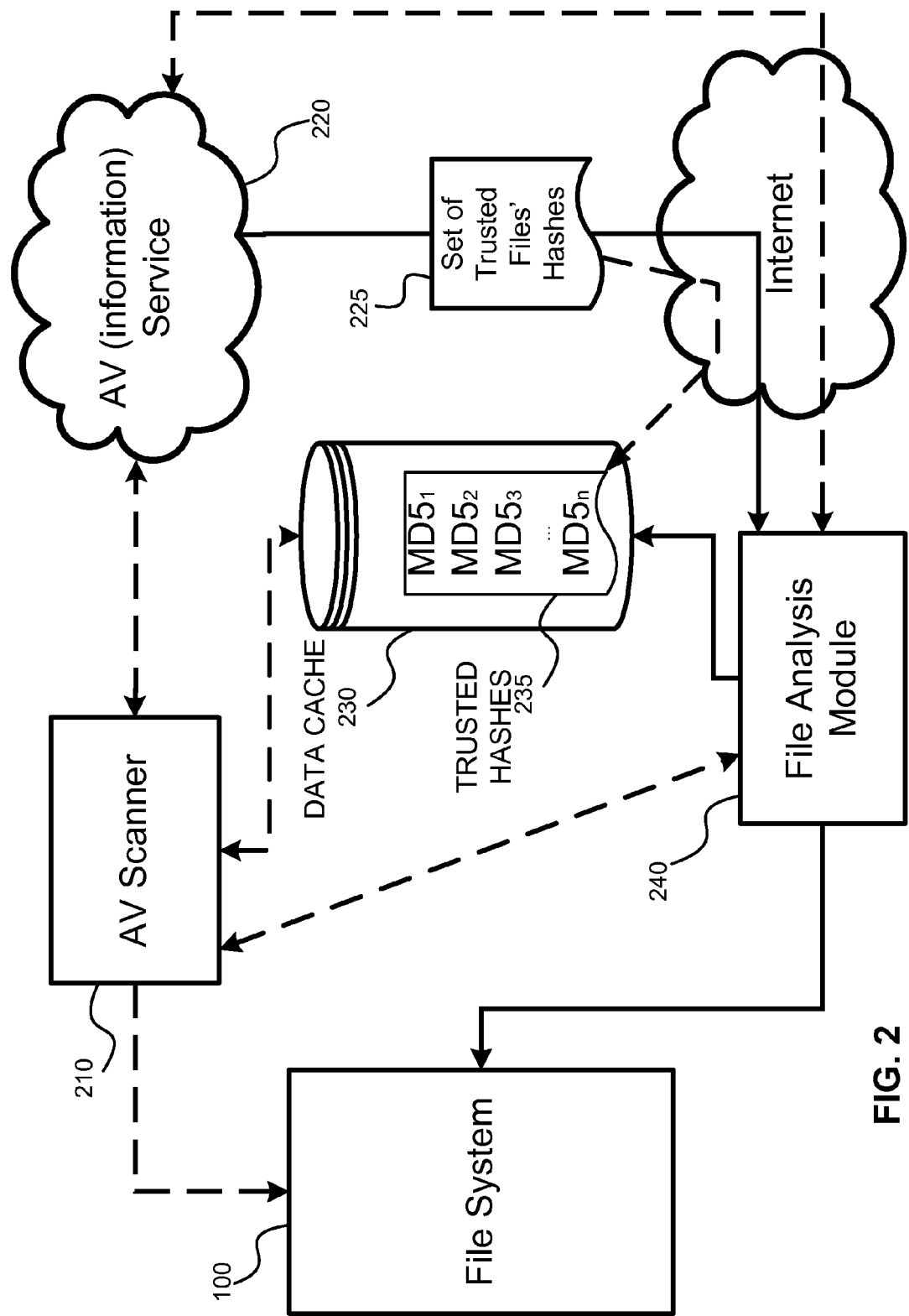
FIG. 2 illustrates an architecture of AV processing optimization system, in accordance with the exemplary embodiment.

Analyses can be based on a combination of several types of metadata. FIG. 2 illustrates architecture of disk AV processing optimization system. Note that this is just one example, and the approach is also applicable to, e.g., OAS (on access scanning), HIPS (Host-based Intrusion Prevention System), whitelisting, etc.

The system includes the following modules. An AV scanner 210 that controls processing of the files in the file system 100. The AV scanner 210 is connected to a data cache 230. The AV scanner 210 sends requests regarding the unknown files 102 to an AV service 220. The data cache 230 contains a list of hashes of trusted files 235 or a list of metadata of the trusted files 235. As a unique file identifier (and, as a consequence, as an entry in the list of file identifiers), any data item that uniquely identifies a file can be used, e.g., the file itself, a file hash, file metadata, file system identifiers associated with the file (e.g., NTFS identifiers), and so on. Hash lists are used as an example in this description.

In other words, the data cache 230 contains what might be called a trusted info cache 235, which permits an improvement in the speed of the AV scan. Note that calculation of a hash of a file can be an expensive operation, sometimes more expensive that the AV scan of the file. The advantage is gained because the hash of a file only needs to be calculated once by the file processing module, after receiving the set of hashes of the trusted files from the analysis module 240. The analysis module 240 receives the set of hashes of the trusted files 225 from the AV service 220, after which, if the file is in the list of trusted files, it is marked in the trusted info cache 230 as trusted. The AV scanner 210, before conducting a scan of the file, only needs to check the trusted info cache 230, and skip the AV scan.

Note also that the trusted file hashes can be received from the Internet or from the cloud, or calculated locally from the installer. The trust check of the installer can be local (e.g., digital signature), or by request to a remote server or cloud.

The AV service 220 analyses the files in the file system 100, particularly unknown files 102, searches for trusted files 101 associated with the trusted key file 103 and generates a set of trusted files' hashes 225. The AV service 220 provides the lists of hashes of the trusted files 225 to the data cache 230. The AV service 220 interacts with the AV scanner 210. The nature of this interaction is described below.

In an exemplary embodiment, the AV scanner 210, which controls the file scanning process in the file system 100, interacts with the data cache 230 to receive a list of unique identifiers of trusted files. The data cache 230, storing the list of identifiers of trusted files, interacts with the analysis module 240, provides sets of trusted file identifiers 225, and receives requests for files 102 and 104 analysis from it. The analysis module 240 analyzes the files in the file system 100, and interacts with the information service 220 and the cache 230, to which he adds new lists of unique identifiers of trusted files 225.

As noted above, in one embodiment, a file analysis module 240 can be used. The file analysis module 240 analyses files in the file system 100 as a background process. The file analysis module 240 interacts with the AV scanner 210 and sends requests regarding the unknown files 102 being analyzed to the AV service 220. The file analysis module 240 fills the list of hashes of trusted files 235 stored into the data cache 230 with new set of hashes of the trusted files 225.

The AV scanner 210 is launched for processing the files in the file system 100. The AV scanner 210 requests data regarding the files from the data cache 230. The data cache 230 provides, upon request, a list of unique identifiers (e.g., hashes) of the trusted files 235 to the AV scanner 210. As noted earlier, a unique file identifier can be any data that identifies the file, for example, a file hash, a checksum, a unique name, file metadata, version number, some combination of these, etc. The AV scanner 210 generates hashes of all files in the file system 100 and compares these hashes with a list of the trusted files' hashes 235 in the data cache 230.

According to the exemplary embodiment, hashes can be generated and compared, either sequentially or simultaneously. In case of coincidence of a hash of the analyzed file with a hash from the list of the trusted hashes 235, the file is passed on without further checking, because this file is a known trusted file 101. If a matching hash is not found in the list 235, the file is the unknown file 102. The AV scanner 210 places the file 102, as an example, into quarantine and sends a request for analysis of this unknown file 102 to the AV service 240. The request can include the unknown file 102 itself, its unique identifier, etc.

In one embodiment, the AV scanner 210, upon receiving the request, can compare hashes or identifiers, or can compare the list of identifiers with other lists stored in the cache 230. As one example, using NTFS identifiers, the AV scanner 210 will compare NTFS identifiers of the unknown files with NTFS identifiers of trusted files. If the NTFS identifiers are in the list of trusted identifiers, then the files in question need not be scanned further. Otherwise, the AV service 220 will be sent a request to analyze the file. The list of NTFS identifiers can be added to, during the process of scanning, i.e., once the file is verified to be clean, its NTFS identifier can be added to the list of trusted identifiers in the cache 230.

In one embodiment, the AV scanner 210 can check files in the file system 100 using any type of file identifiers, for example, file metadata. In this case, the data cache 230 has to store lists of file identifiers. Once a request for the unknown file 102 is received, the AV service 220 checks the unknown file 102 for legitimacy (for example, presence of the file 102 in a white list database used by the AV service 220).

If the unknown file 102 is deemed not legitimate, the AV service 220 stops any further analysis of the file 102 and informs the AV scanner 210. In turn, the AV scanner 210 begins processing of the file 102 using some or all available means (for example, searching signature databases, heuristic analysis, behavioral analysis, etc.). Alternatively, the AV service 220 can make an answer-request to the AV scanner 210 for further analysis of the file 102. The request can contain several parameters, such as source of the file, time of file installation, file size, file name, file path, whether the file is signed, file format (e.g., pdf, executable, audio/video), other metadata, etc. The AV service 220 can check the file 102 against white list and black list databases provided within the AV service 220. Other analysis options include approaches described in utility models U.S. Pat. Nos. 7,743,419 and 7,640,589, incorporated herein by reference in their entirety.

If the unknown file 102 is deemed legitimate (and, therefore, becomes a trusted file 101), the AV service 220 analyses the hash of this file 101 and determines whether this file 101 is also a trusted key file 103.

If the file 101 is deemed to be a trusted key file 103, the AV service 240 selects all trusted files 101 associated with the trusted key file 103. Then, the AV service 220 generates a set of hashes from all trusted files 101 found and passes the set of hashes to the data cache 230 (through the AV scanner 210). The set of hashes is added to a list of the trusted files 235 in the data cache 230. If the file 101 [is determined not to be a trusted key file 103, only the hash of the file 101 is added to the data cache 230.

According to the exemplary embodiment, if the file 101 is not the trusted key file 103, the AV service 240 searches for the trusted key file (or files) 103 the file 101 belongs to. If at least one trusted key file 103 is found, the AV service 220 sends the request to the AV scanner 210 for finding the trusted key files 103 in the file system 100. Then, if the AV scanner 210 finds the trusted key file 103 in the file system 100, it makes a second request to the AV service 220 for finding all trusted files 101 associated with the newly found trusted key file 103.

Search for the trusted key file 103 (or multiple key files) can be limited by some search boundaries (for example, the search can be limited to a volume where the unknown file 102 is located). If at least one trusted key file 103 is not found in the file system 100, the AV scanner 210 informs the AV service 220. Accordingly, the AV service 220 will not identify the files 101 associated with the trusted key file 103 and will stop processing this request from the AV scanner 210.

Alternatively, the AV service 220 can provide only a property (e.g., a flag in a form of a single bit) in response to a request regarding the unknown file 102. This property informs the AV scanner 210 that the file 102 is the trusted key file 103 and that a corresponding set of trusted files 101 is formed. If the AV scanner 210 sends a second request, the set of trusted files 101 is provided.

In one embodiment, the AV scanner 210 determines ahead of time whether the file 102 is probably a untrusted key file 104. Then, the AV scanner 210 sends requests to the AV service 220 only with regard to the untrusted key file 104. If the AV service 220 determines that the untrusted key file 104 is actually a trusted key file 103, then the AV service 220 identifies a set of the trusted file's hashes 225 associated with the trusted key file 103 and sends this set to the data cache 230 (through the AV scanner 210).

In yet another exemplary embodiment, the system includes the file analysis module 240. Then, the AV scanner 210 interacts with the AV service 220 via the file analysis module 240. Additionally, the file analysis module 240 performs other operations: search for the unknown files 102 in the file system 100, sending the sets of trusted files' hashes 225 to the data cache 230, analysis of the received from the AV service 220 sets of trusted hashes. The file analysis module 240 makes a request regarding the unknown file 102 and receives a response from the AV service 220. The response can be in the following form:

1) a set of hashes of the trusted files 225 associated with the unknown file 102, if the unknown file 102 is legitimate and is a trusted key file 103; and 2) the information regarding the unknown file 102 itself.

The answer depends on whether or not the unknown file 102 is a trusted key file 103. According to one embodiment, the file analysis module 240 can analyze whether or not the unknown file 102 received from the AV scanner is the untrusted key file 104. In this case, the file analysis module 240 makes a request to the AV service 220 only with regard to the untrusted key files 104. If the AV service 220 determines that the untrusted key file 104 is actually a trusted key file 103, then the AV service 220 identifies only the hashes of the trusted files 101 associated with the trusted key file 103 and forms a set of the trusted files' hashes 225. Then, the AV service 220 sends this set 225 to the data cache 230 (through the file analysis module 240).

In yet another embodiment, the AV service 220 provides a set of hashes of the trusted files 225, formed for the requested unknown file 102, to the file analysis module 240, instead of the data cache 230. Then, the file analysis module 240 first processes the received set of the trusted hashes 225. The file analysis module 240 searches for each file from the set of hashes of the trusted files 225 in the file system 100. The file analysis module 240 generates a hash of each file of the file system 100. For those files whose hashes match a list of trusted hashes from the AV service 220, the file from the set of hashes 225 is added to the data cache 230 (since the files are, at that point, known to be trusted, and the system needs to verify that they are actually present in the file system). If the hash of the file is not found in the file system 100, the hash is deleted (in other words, if there is no hash, then there is no corresponding file, and there is no purpose in storing the hash).

In another embodiment, the file analysis module 240 searches for the untrusted key files 104 in the file system 100. The search is performed as a background process and when the AV scanner 210 is in a waiting mode. This search is needed for initial population of the data cache 230 (essentially, a database, such as MySQL, DB2, etc., which is located on the client computer) with identifiers or hashes of the trusted files 101. The hashes of identified untrusted files are not normally added to the cache 230 initially, but are first checked using the module 220. The cache 230 is further added to by the file analysis module 240, for example, when the system is idle, and new (unknown) files are identified and verified, with subsequent addition of their hashes to the cache 230.

In this case, the file analysis module 240 searches through the file system 100 for installed applications, and identifies their untrusted (unknown) key files 104. Once the untrusted key files 104 (resulting from the installed applications) are found, the file analysis module 240 checks the found untrusted key files 104 against the list of the trusted files 235. If the hashes of these key files are already in the list of hashes of the trusted files 235, the file analysis module 240 lets them pass. If the hashes of the unknown key files 104 are not in the list of the trusted files 235, the file analysis module 240 makes a request with regards to at least one untrusted key file 104 of the found application to the AV service 220.

The AV service 220 analyzes the request, verifies that the unknown file 104 can be trusted (i.e., it can be treated as a trusted key file 103), forms a set of hashes of the files 101 associated with the requested key file 104 (now trusted key file 103) and provides the set to the data cache 230 or to the file analysis module 240. The file analysis module 240 checks the set of hashes of the trusted files 101 against the files with the same hashes, which are located in the file system 100. If matching hashes are found, the file analysis module 240 provides the hashes to the data cache 230. If the matching hashes are not found, the file analysis module 240 deletes the hashes of the trusted files 101.

Alternatively the file analysis module 240 does not search through the entire file system 100, but only checks in the area of most likely locations of the files, for example in C:/Program Files. According to one exemplary embodiment, the file analysis module 240 checks if the list of the trusted files 235 stored in the data cache 230 are up-to-date. The file analysis module 240 periodically searches the file system 100 for files with hashes that are on the list of the trusted files 235. The file search can be performed across the entire file system 100, as well as, only along the path (address) where the file was originally found. In other words, the file analysis module 240 maintains a current list of hashes in the cache 230 by periodically checking the hashes in the cache 230 against hashes of files in the file system. If a hash from the cache 230 is not found among the hashes of files in the file system, that means this hash can be deleted, since the file has most likely been deleted. The most likely location for finding the particular hash is in the path where the file was originally located.

As another option, the analysis module 240 can track operations with files, when the user is using the file system—for example, installation of new software, changes or deletions of existing files, etc., and the analysis module 240 keeps track of the changes in the file system 100. Once the user is finished, the analysis module 240 makes corresponding updates to the cache 230. If changes were done to the files 101 they will become unknown files 102 (because their hashes have been changed). In this case, the analysis module 240 will make a corresponding request to the AV service 220, and will update the cache 230 based on the response. If the response indicates that the files are trusted files, then the analysis module 240 will add the hashes to the cache 230 and the list 235. Otherwise, if the files are unknown files 102, the analysis module will use the AV scanner 210 to analyze the files. If a software installation was performed, then the analysis module 240 will identify the key files 104, and will analyze the untrusted key files 104. Also, the analysis module 240 can work in parallel with other user tasks, rather than waiting for the user to finish.

As yet another option, instead of sending the requests to the service 220, the file analysis module 240 can itself perform the check of whether the file is trusted, or not. This can be done, for example, during software installation. Any software is one or more files, which need to be copied to the user's computer. Typically, these files are provided in packed or archived form. The installer needs to be a signed (trusted) container. A trusted container is signed by the software vendor, for example, with a digital signature of the vendor. In this case, the analysis module 240 can mark all the files of that software package as trusted files 101, and send the hashes to the cache 230. In this case, the analysis module 240 will need to verify the digital signature, for example, by sending a request to the AV service 220, or it can do it independently (e.g., based on a list of digital signatures stored on the computer).

As noted earlier, the key files can be, for example:

(a) Installers—typically, all installers are key files.

(b) *.exe files, though not necessarily all such files. Normally, those *.exe files that are related to program launches are key files. A common place for such files is in the folder C:\Program Files, for example, for the Lingvo application, there is a file Lingvo.exe located in C:\Program Files\ABBYY Lingvo x3. As another example, for Adobe Reader there is a AcroRd32.exe located in C:\Program Files\Adobe\Reader 10.0\Reader.

(c) An *.exe is often unique for each program version, therefore, for a new version of Lingvo, there will be its own *.exe file. However, many ordinary files might be identical across versions.

(d) *.msi installation files are also frequently key files.

(e) Files with characteristic names, such as setup, autorun, are also frequently key files.

(f) Another example of a key file is a file from an installation package that does not change and contains such things as the software license agreement, digital signature, and so on.

Figure 3:
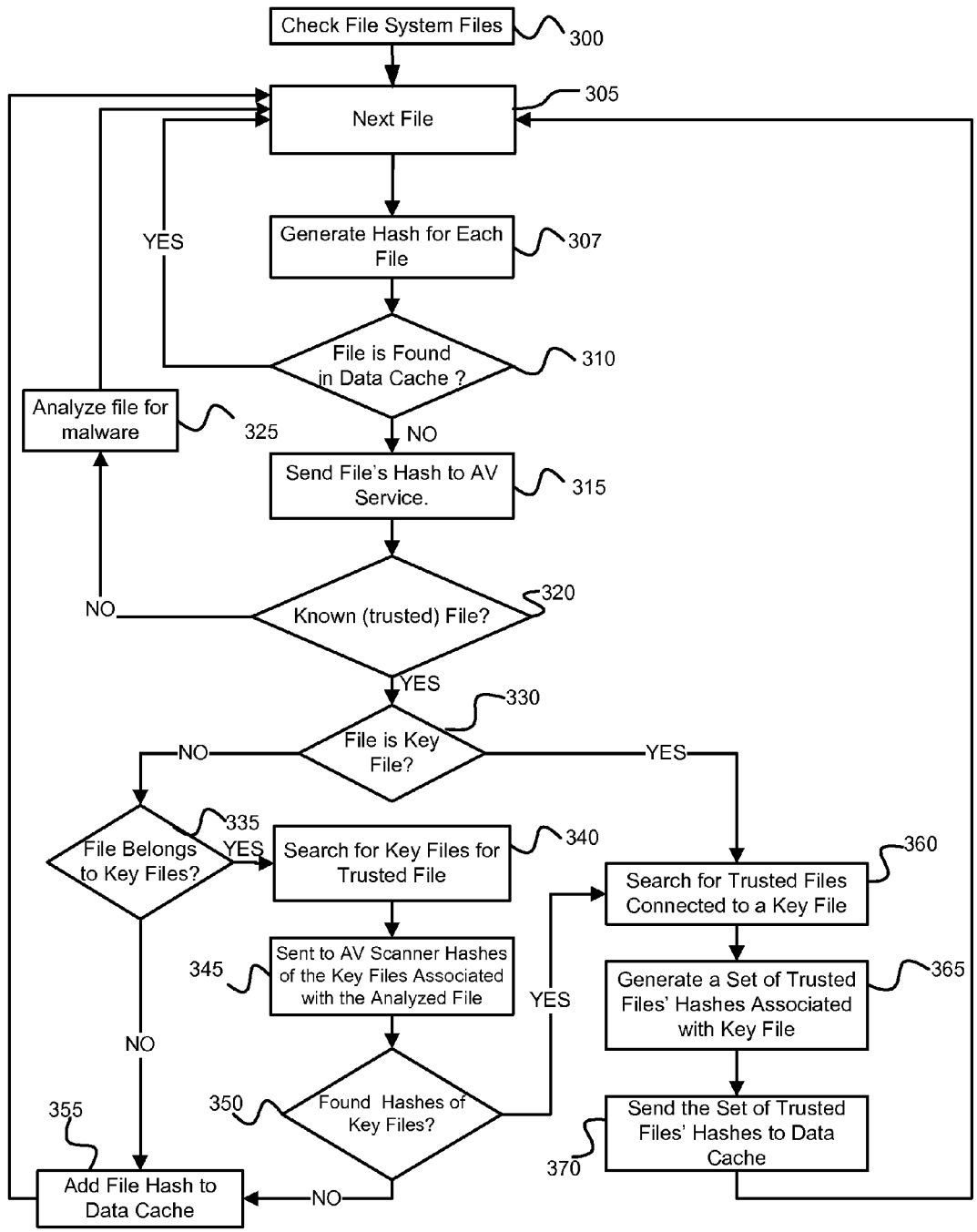
FIG. 3 illustrates a method for optimization of the AV processing of the disk files, in accordance with the exemplary embodiment.

FIG. 3 illustrates a method for optimization of the AV processing of the disk files. The system checks application files in the file system 100. In step 300, the AV scanner 210 start checking files in the file system 100. Then, in step 305, the AV scanner 210 begins to check all files one by one and generates a hash for each file (step 307).

Then, in step 310, the hash generated in step 307 is compared with the stored hashes form the data cache 230. If, in step 310, a matching hash is found, then the file is a known file 101 and the AV scanner moves to the next file in step 305. If, in step 310, the match is not found, the AV scanner sends the file's hash to the AV service in step 315. The actual file is temporarily placed into a quarantine (not shown in the flow chart).

In step 320, the AV service determines if the file is a known file. If the file is not a known file, the AV scanner checks the file for malware, using any number of techniques, such as emulation, signature, heuristic analysis, etc. (see step 325). The process moves back to step 305 for the next file. If, in step 320, the file is determined as a known file, the file is analyzed in step 330 for being a key file. If, in step 330, the file is determined not as a key file, then, in step 335, the file is analyzed for belonging to (i.e., being connected to, or associated with) key files. If the file is associated with some key file or files, the process searches for the corresponding key files in step 340 (for example, by using a database of files associated with a key file, or by doing the same process of identifying all the associated files for a key file, but in reverse direction).

Then, in step 345, the hashes of the key files found in step 340 are sent to the AV scanner for finding the files in the file system. Subsequently, in step 350, the AV scanner searches for the files, for example, by comparison of hashes, or by looking only at unknown files. If the key files are not found in step 350, in step 355, the file hash is added to a list of trusted files in the data cache. If, in step 350, the key file hash is found in the file system, the hash is passed on to step 360 for further processing.

If, in step 335, it was decided (by the system or administrator) not to search for key files (for example, if a particular file is associated with too many key files, or is known a priori to be untrusted), the steps 340, 345 and 350 are omitted and the AV service 220 moves to step 355. Then, the file processing is finished and the AV scanner 210 moves to the next file in step 305. If, in step 330, the file was determined to be a key file, the file is passed on to step 360, where the AV service 220 searches for trusted files associated with the key file. Subsequently, in step 365, a set of hashes is formed for all of the trusted files found in step 360. Then, in step 370, the set of the trusted hashes is transferred to the data cache 230. In the future, if the hash is found in the cache 230, that file does not need to be scanned. The AV scanner 210 moves to the next file in step 307.

Figure 4:
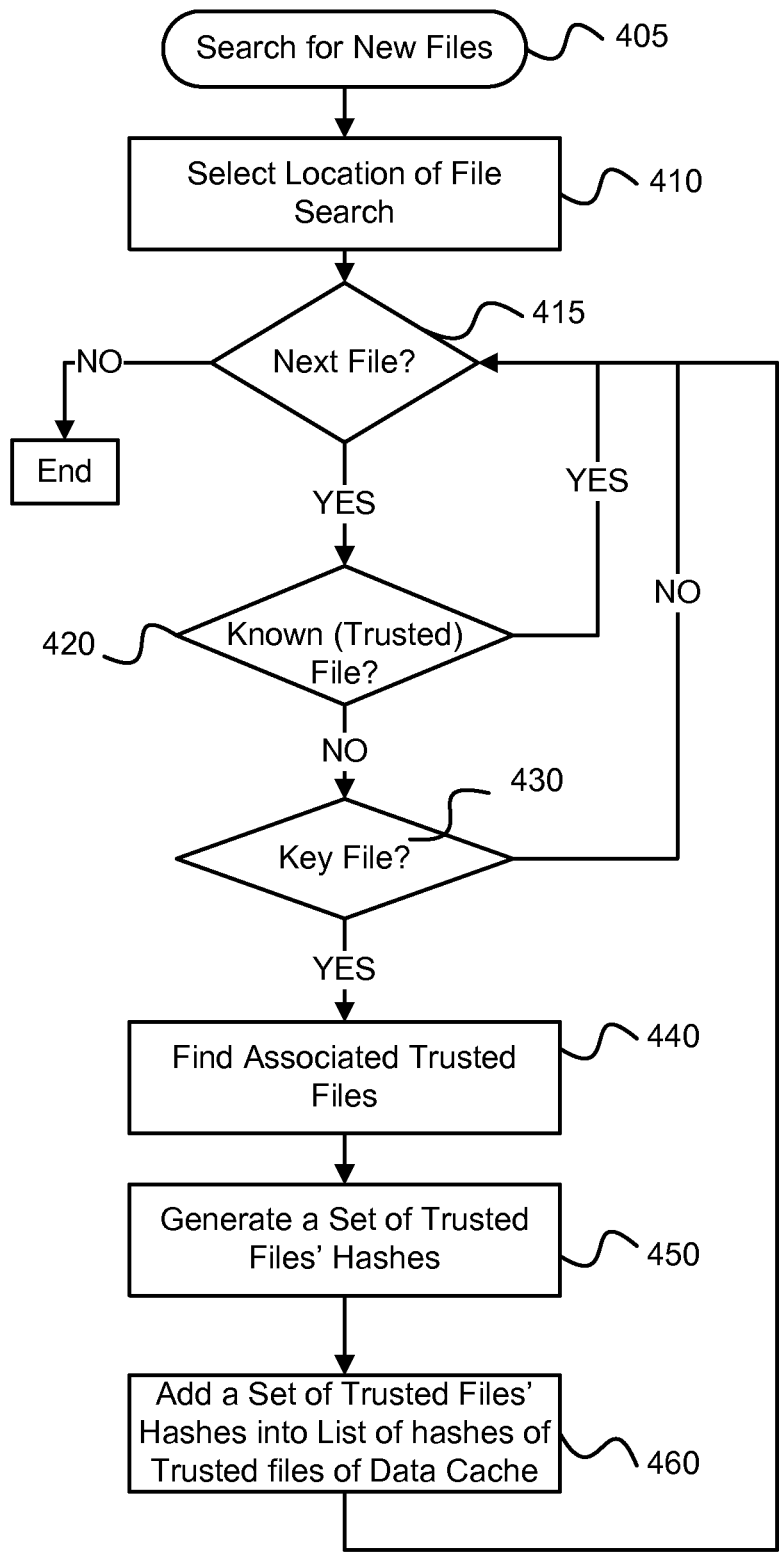
FIG. 4 illustrates a flow chart of the file analysis, in accordance with the exemplary embodiment.

FIG. 4 illustrates a flow chart of the file analysis process, in accordance with the exemplary embodiment. The file analysis module 240 searches for new files (step 405). In step 410, a location of unknown file search is selected. In step 415, the next file is acquired. If, in step 420, the file is determined to be known, the file is skipped and the file analysis module moves to the next file in step 415. If the file is determined to be unknown file 102, the file is passed to the next step 430.

Then, in step 430, the unknown file 102 is determined to be only unknown, the file 102 is skipped and the file analysis module moves to the next file in step 415. If the file 102 is determined to be an unknown/untrusted key file 104, the file analysis module determines to be the file 104 is a known/ trusted key file 103 (through the aid of AV service 220). If the file 104 is not a known key file 103, the file analysis module deleted to be this file 104 and moves back to step 415 for the next file. If the file 104 is determined as a known key file 103, the file analysis module moves to step 440, where searches for trusted files 102 associated with the key file 103 (through the aid of AV service 220). Subsequently, in step 450, a set of hashes of the connected (trusted) files found in step 440 is formed. Then, in step 460, the set of trusted hashes is added to a list on the data cache. The file analysis module moves to the next file in step 415.

Figure 5:
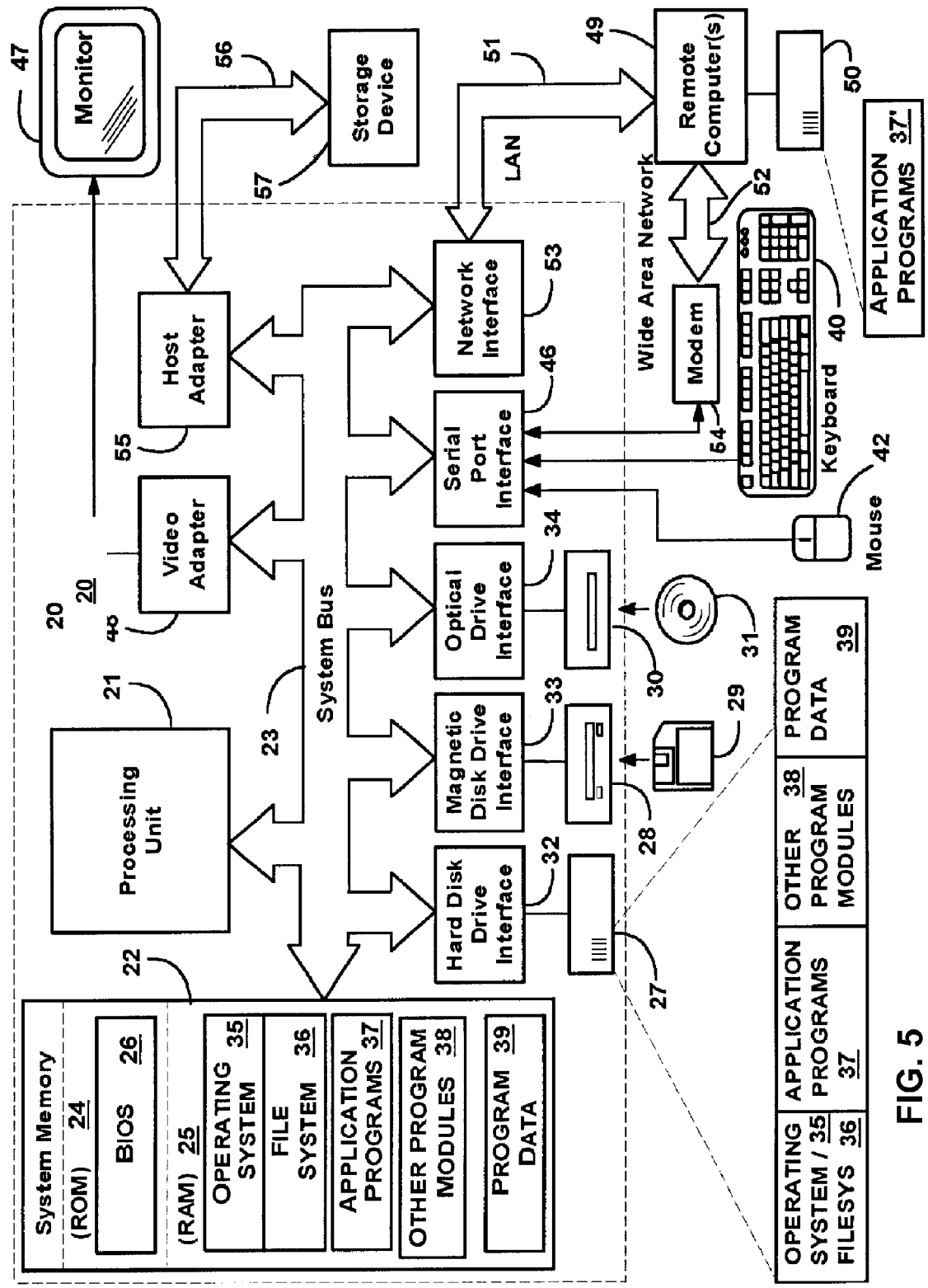
FIG. 5 illustrates a schematic of an exemplary computer system that can be used for implementation of the invention.

With reference to FIG. 5, an exemplary system for implementing the invention includes a general purpose computing device in the form of a computer 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, 37', other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 110, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for effective AV scanning of the disk files.

It should also be appreciated that various modifications, adaptations and alternative embodiments thereof may be made within the scope and spirit of the present invention. The invention is further defined by the following claims.

What is claimed is:

1. A computer-implemented system for anti-virus (AV) processing of disk files, the system comprising:
   a disk file system;
   an AV scanner for processing files of the disk file system and identifying key executable files in the disk file system while the system is idle;
   a cloud-based AV service for servicing requests from the AV scanner;
   a file analysis module for analyzing the files provided by the AV scanner, wherein the file analysis module analyses the files while the system is idle; and
   a data cache connected to the AV scanner for storing unique identifiers of trusted files,
   wherein:
      the AV scanner compares a unique identifier of at least one file to a list of trusted files stored in the data cache;
      the AV scanner sends a request regarding at least one of the files to the AV service if a matching unique identifier is not found in the data cache;
      the AV service, for each requested file, finds in its database trusted files associated with a key executable file, wherein the key executable file is associated with the requested file; and
      the AV service responds with unique identifiers for all of the found trusted files; and
      the AV service provides the unique identifiers to the data cache.

2. The system of claim 1, wherein the identifying of the key executable files is a background process.

3. The system of claim 1, wherein the file analysis module fills the data cache with new unique identifiers of the trusted files.

4. The system of claim 1, wherein the data cache provides a list of unique identifiers of the trusted files to the AV scanner.

5. The system of claim 4, wherein the unique identifiers are hash values.

6. The system of claim 5, wherein the AV scanner generates hash values of the disk files and compares the hash values against hash values of the trusted files.

7. The system of claim 6, wherein, if a hash of a disk file matches the trusted hash value, the disk file is not subjected to the AV processing.

8. The system of claim 6, wherein, if a matching trusted hash value is not found for a disk file, the AV scanner places the disk file into quarantine and sends a request for analysis of the disk file to the AV service.

9. The system of claim 8, wherein the AV service checks the disk files against a whitelist database.

10. The system of claim 8, wherein the AV service checks the disk files against a blacklist database.

11. The system of claim 1, wherein the AV scanner checks disk files' metadata.

12. The system of claim 1, wherein the unique identifiers are NTFS identifiers.

13. A computer-implemented method for optimization of ant-virus (AV) processing of disk files, the method comprising:
   scanning a disk file system and identifying key executable files in the disk file system while the system is idle;
   generating a unique identifier for a file in the disk file system;
   as a background process, comparing the unique identifier to unique identifiers in a list of trusted files stored in a data cache;
   sending the unique identifier to a server-based AV service, if a matching unique identifier is not found in the data cache;
   skipping the file and scanning a next disk file system file, if a matching unique identifier is found in the data cache;
   if the file is not a known file, quarantining the file;
   if the file is a known file, determining if the file is a key executable file;
   using the AV service, searching for all trusted files associated with the file, in a database of the AV service, if the file is the key executable file;
   finding the key executable file with which the file is associated if the file itself is not a key executable file, and searching for all trusted files associated with the key executable file;
   generating a unique identifier for each of the trusted files;
   sending the unique identifier of the key executable file and the unique identifiers of the trusted files to the list of unique identifiers of trusted files stored in the data cache.

14. The method of claim 13, further comprising finding a key executable file with which the file is associated with, if the file itself is not a key executable file.

15. The method of claim 13, wherein the unique identifiers are any of hash values, metadata, and identifiers of the file system.

16. The method of claim 13, wherein the generating of the unique identifier for the disk file is performed by a file analyzer module.

17. The method of claim 13, wherein the key executable file is an application installer.

18. The method of claim 13, wherein the identification for the key executable file is limited to a volume where the file connected to the key executable file is located.

19. A computer program product comprising a non-transitory computer readable medium having a computer program logic stored thereon for implementing the steps of claim 13.

20. A computer-implemented system for anti-virus (AV) processing of disk files, the system comprising:
   a disk file system;
   an AV scanner for processing files of the disk file system;
   a file analysis module for analyzing the files provided by the AV scanner, wherein the file analysis module analyses the files as a background process and the AV scanner is in waiting mode; and
   wherein the AV scanner compares a unique identifier of at least one file to unique identifiers in a list of trusted files to determine unknown files;
   a data cache connected to the AV scanner for storing unique identifiers of trusted files,
   wherein the AV scanner sends requests regarding the unknown files to an external server, and receives, from the external server, (a) results of analysis of the unknown files, including trusted files associated with a key executable file, wherein the key executable file is associated with the unknown files, and (b) a unique identifier of each of the trusted files, and wherein the unique identifiers received from the external server are stored in the data cache.

21. A computer-implemented system for anti-virus (AV) processing of disk files, the system comprising:
an AV service for servicing requests from an AV scanner that processes files of a client computer's disk file system while the system is idle, wherein the AV scanner compares a unique identifier of at least one file to unique identifiers in a list of trusted files to determine unknown files;
wherein the requests include the unknown files and metadata of the unknown files;
a blacklist of untrusted files and a whitelist of trusted files maintained by the AV service,
wherein:
the AV service receives requests regarding the unknown files from the AV scanner;
the AV service checks the unknown files against the blacklist and the whitelist, and identifies all the trusted files associated with a key executable file, wherein the key executable file is associated with one or more of the unknown files; and
the AV service generates a hash of each of the trusted files and transmits the hashes to a data cache located on the client computer.

22. A computer-implemented system for anti-virus (AV) processing of disk files, the system comprising:
a disk file system;
an AV scanner for processing files of the disk file system and identifying key executable files in the disk file system while the system is idle;
a cloud-based AV service for servicing requests from the AV scanner;
a file analysis module for analyzing the files provided by the AV scanner, wherein the file analysis module analyses the files as a background process; and
a data cache connected to the AV scanner for storing unique identifiers of trusted files, wherein the AV scanner compares a unique identifier of at least one file to unique identifiers in a list of trusted files,
wherein:
the AV scanner sends a request regarding the at least one file to the AV service, if the unique identifier of the at least one file is not found in the list of trusted files;
the AV service for each requested file finds, in its database, associated trusted files associated with a key executable file, wherein the key executable file is associated with one or more of the requested files; and
the AV service responds with unique identifiers for all of the found trusted files and the AV scanner provides the received unique identifiers to the data cache.

23. A computer-implemented system for anti-virus (AV) processing of disk files, the system comprising:
a disk file system;
an AV scanner for processing files of the disk file system and identifying key executable files in the disk file system while the system is idle, wherein the AV scanner compares a unique identifier of at least one file to unique identifiers in a list of trusted files;
a cloud-based AV service for servicing requests from the AV scanner;
a file analysis module for analyzing the files provided by the AV scanner, wherein the file analysis module analyses the files as a background process; and
a data cache connected to the file analysis module for storing unique identifiers of trusted files,
wherein:
the file analysis module sends a request regarding at least one file to the AV service, if the unique identifier of the at least one file is not found in the list of trusted files;
the AV service, for each requested file, finds in its database trusted files associated with a key executable file, wherein the key executable file is associated with one or more of the requested files; and
the AV service responds with unique identifiers for all of the found trusted files, and the file analysis module stores the received unique identifiers in the data cache.

* * * * *